US010275299B2

(12) United States Patent
Bhutta et al.

(10) Patent No.: US 10,275,299 B2
(45) Date of Patent: Apr. 30, 2019

(54) EFFICIENT TRANSFER OF DATA FROM CPU TO ONBOARD MANAGEMENT DEVICE

(71) Applicant: International Business Machines Corporation, Armonk, NY (US)

(72) Inventors: Haseeb A. Bhutta, Houston, TX (US); Brent W. Yardley, Hillsboro, OR (US)

(73) Assignee: International Business Machines Corporation, Armonk, NY (US)

( * ) Notice: Subject to any disclaimer, the term of this patent is extended or adjusted under 35 U.S.C. 154(b) by 121 days.

(21) Appl. No.: 15/422,748

(22) Filed: Feb. 2, 2017

(65) Prior Publication Data

US 2018/0217889 A1 Aug. 2, 2018

(51) Int. Cl.
*G06F 11/07* (2006.01)
*G06F 11/14* (2006.01)
*G06F 11/22* (2006.01)

(52) U.S. Cl.
CPC ...... *G06F 11/0772* (2013.01); *G06F 11/0721* (2013.01); *G06F 11/0751* (2013.01); *G06F 11/0775* (2013.01); *G06F 11/0778* (2013.01); *G06F 11/1417* (2013.01); *G06F 11/2284* (2013.01)

(58) Field of Classification Search
CPC .............................. G06F 11/07; G06F 11/0772
USPC .......................................................... 714/2
See application file for complete search history.

(56) References Cited

U.S. PATENT DOCUMENTS

| | | | |
|---|---|---|---|
| 6,718,488 B1 | 4/2004 | Jue et al. | |
| 8,010,724 B2 | 8/2011 | Wortham et al. | |
| 9,059,906 B1 | 6/2015 | McCleland et al. | |
| 9,336,167 B2 | 5/2016 | Danis et al. | |
| 2004/0123007 A1* | 6/2004 | Stevens, Jr. | G06F 13/378 710/260 |
| 2004/0193918 A1* | 9/2004 | Green | H04L 63/1433 726/22 |
| 2008/0059682 A1* | 3/2008 | Cooley | G06F 13/4291 710/305 |

(Continued)

FOREIGN PATENT DOCUMENTS

GB 2457147 A 12/2008

OTHER PUBLICATIONS

Escobar, Antonio Jose S. et al., "An I2C Based Mixed-Signal Test and Measurement Infrastructure", Mixed-Signals, Sensors and Systems Test Workshop (IMS3TW), 2014 19th International Sep. 17, 2014 6 pages. IEEE.

*Primary Examiner* — Kamini B Patel
(74) *Attorney, Agent, or Firm* — Stephen R. Tkacs; Stephen J. Walder, Jr.; Wenjie Li

(57) ABSTRACT

A mechanism is provided in a data processing system for transferring failure data from a processing unit to a management device. In response to detecting a failure of the processing unit, a computing device within the data processing system gathers failure information from machine check registers of the processing unit. The computing device generates a time stamp command communicating a time and date of the failure information and sends the time stamp command to the management device. The computing device generates at least one error data command communicating error data derived from the failure information and sends the at least one error data command to the management device.

21 Claims, 3 Drawing Sheets

(56) References Cited

U.S. PATENT DOCUMENTS

2009/0006889 A1\* 1/2009 Holdaway ........... G06F 11/0745
 714/5.11
2015/0356034 A1 12/2015 Pamley et al.
2017/0040057 A1\* 2/2017 Cho ........................ G06F 13/16

\* cited by examiner

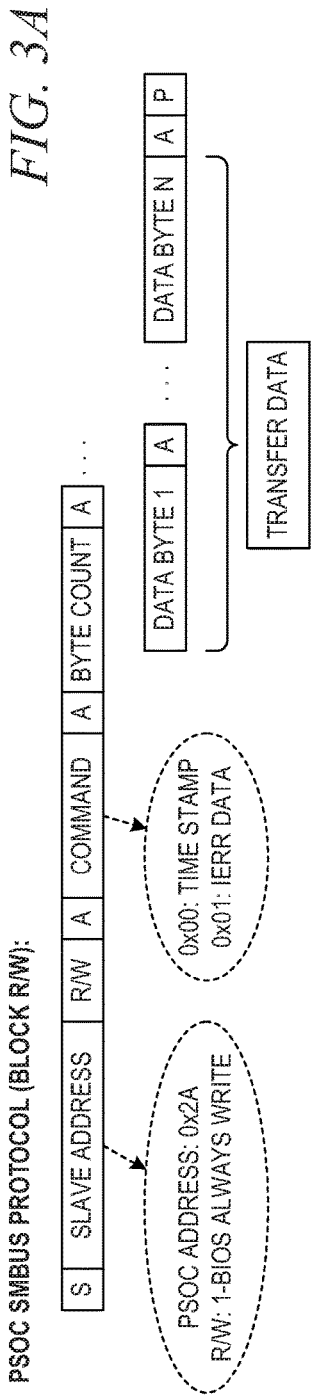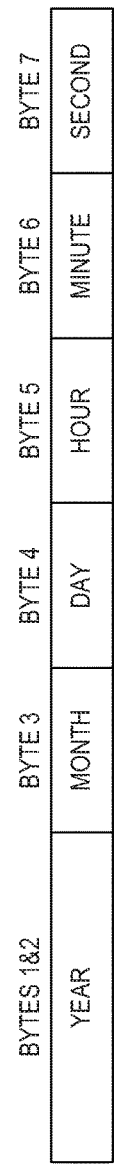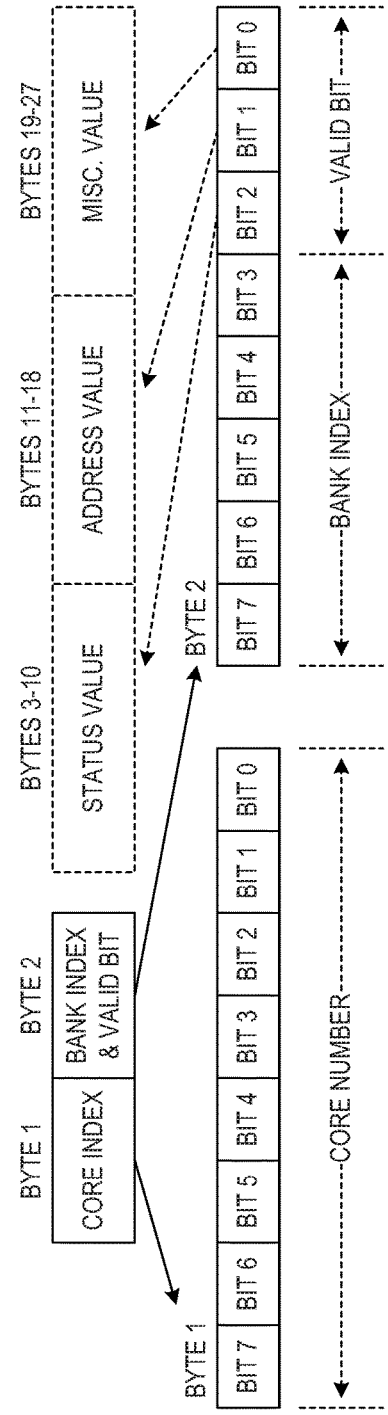

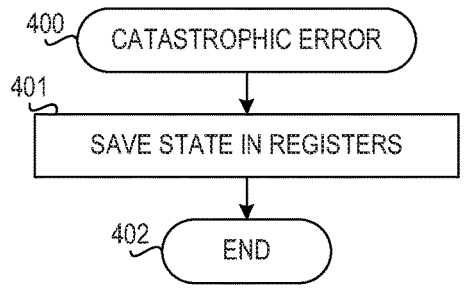
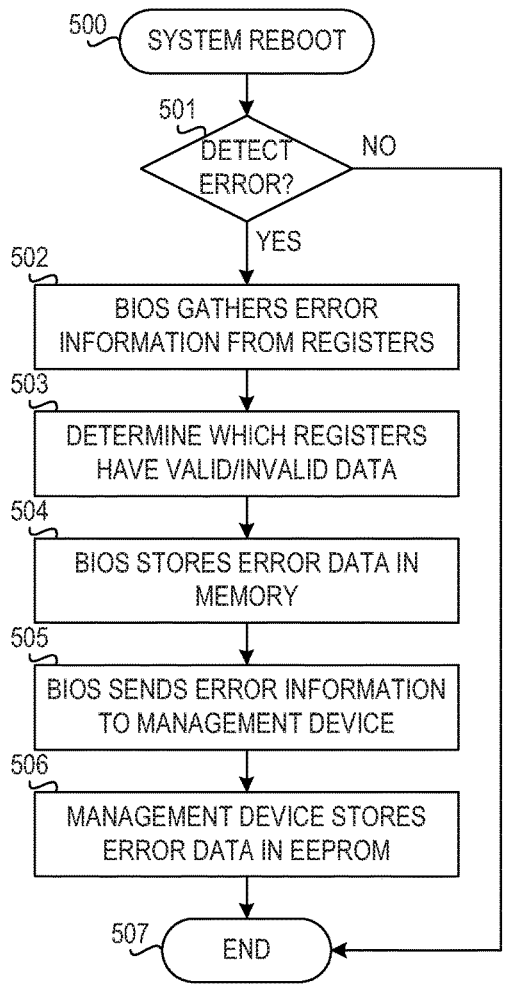
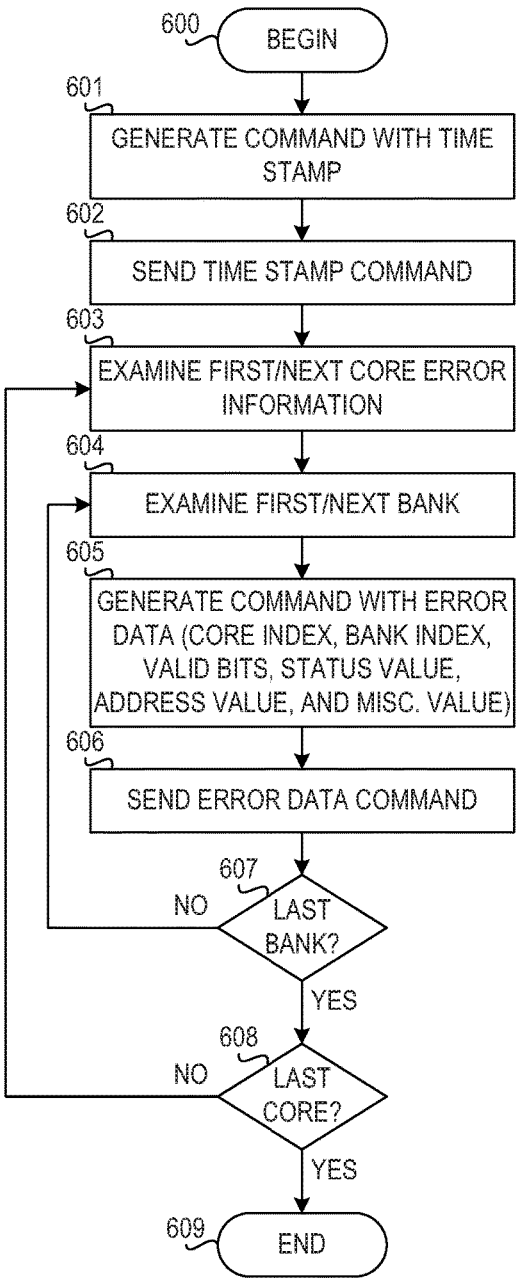

EFFICIENT TRANSFER OF DATA FROM CPU TO ONBOARD MANAGEMENT DEVICE

BACKGROUND

The present application relates generally to an improved data processing apparatus and method and more specifically to mechanisms for efficient transfer of error data from a central processing unit to a management device.

A central processing unit (CPU) is electronic circuitry within a computer that carries out the instructions of a computer program by performing the basic arithmetic, logical, control, and input/output (I/O) operations specified by the instructions. Principal components of a CPU include the arithmetic logic unit (ALU), which performs arithmetic and logic operations, processor registers that supply operands to the ALU and store the results of ALU operations, and a control unit that orchestrates the fetching and execution of instructions by directing the coordinated operations of the ALU, registers and other components. Most modern CPUs are microprocessors, meaning they are contained on a single integrated circuit (IC) chip. An IC that contains a CPU may also contain memory, peripheral interfaces, and other components of a computer.

The Basic Input/Output System (BIOS) is a type of firmware used to perform hardware initialization during the booting process on a computer and to provide runtime services for operating systems and programs. The BIOS firmware is built into personal computers (PCs) and is the first software they run when powered on. The fundamental purposes of the BIOS in modern PCs are to initialize and test the system hardware components, and to load a boot loader or an operating system from a mass memory device. The BIOS additionally provides an abstraction layer for the hardware, i.e., a consistent way for application programs and operating systems to interact with the keyboard, display, and other input/output (I/O) devices. Variations in the system hardware are hidden by the BIOS from programs that use BIOS services instead of directly accessing the hardware.

When a processing unit, such as a central processing unit (CPU), has a failure, the processing unit saves failure data for first time data capture (FTDC). However, this data usually has a specific format in which it must be saved and a specific protocol for which the data must be transmitted. An electrically erasable programmable read-only memory (EEPROM) is a good tool for saving error data but lacks the ability to support intelligent interaction with the system when data must be stored or retrieved.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided in a data processing system for transferring failure data from a processing unit to a management device. The method comprises gathering failure information from machine check registers of the processing unit in response to detecting a failure of the processing unit. The method further comprises generating a time stamp command communicating a time and date of the failure information and sending the time stamp command to the management device. The method further comprises generating at least one error data command communicating error data derived from the failure information and sending at least one error data command to the management device.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise a processing unit, a basic input/output system (BIOS) connected to the processing unit, and a management device connected to the BIOS by an inter-integrated circuit (I2C) bus. The BIOS is configured to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIGS. 3A-3C depict SMBus command structure for transferring error data to an onboard management device in accordance with an illustrative embodiment;

FIG. 4 is a flowchart illustrating operation of a processing unit for transferring failure data in accordance with an illustrative embodiment;

FIG. 5 is a flowchart illustrating operation of a mechanism for transferring failure data from a processing unit to an onboard management device in accordance with an illustrative embodiment; and FIG. 6 is a flowchart illustrating operation of a mechanism for generating and transferring error information in accordance with an illustrative embodiment.

DETAILED DESCRIPTION

Figure 1:
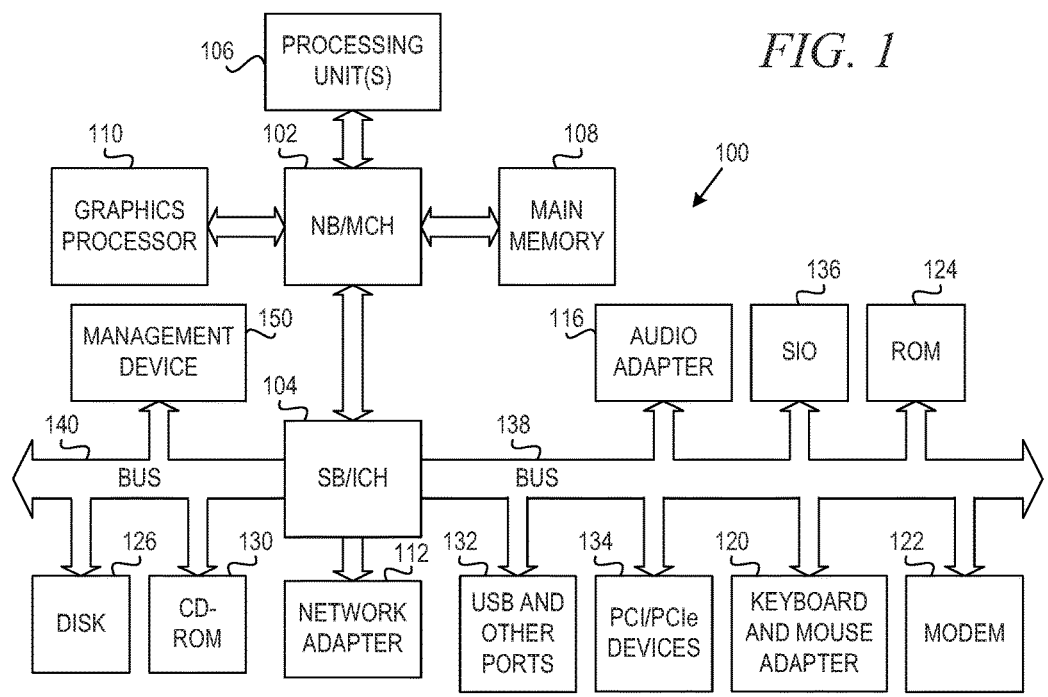
FIG. 1 is an example block diagram of a computing device in which aspects of the illustrative embodiments may be implemented.

The illustrative embodiments provide mechanisms for efficiently transferring data from a processing unit to an onboard management device. In response to a catastrophic error occurring and the system rebooting, the illustrative embodiments provide an efficient and fast communication protocol between the processing unit and a programmable system-on-a-chip (PSoC) management device to determine whether there is data to be read, to store this data, and to retrieve the data. The mechanisms of the illustrative embodiments build on the system management bus (SMBus) protocol over an inter-integrated circuit (I2C) bus to simplify the communication protocol between the devices. In one embodiment, the mechanisms use two commands: a time/ date command and a data command. With these commands, the mechanism can read the information sent and decipher it quickly without any additional overhead or complications.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The illustrative embodiments may be utilized in many different types of data processing environments. In order to provide a context for the description of the specific elements and functionality of the illustrative embodiments, FIG. 1 is provided hereafter as example environments in which aspects of the illustrative embodiments may be implemented. It should be appreciated that FIG. 1 is only an example and is not intended to assert or imply any limitation with regard to the environments in which aspects or embodiments of the present invention may be implemented. Many modifications to the depicted environments may be made without departing from the spirit and scope of the present invention.

As noted above, the mechanisms of the illustrative embodiments utilize specifically configured computing devices, or data processing systems, to perform the operations for efficiently transferring data from a processing unit to onboard management device. These computing devices, or data processing systems, may comprise various hardware elements which are specifically configured, either through hardware configuration, software configuration, or a combination of hardware and software configuration, to implement one or more of the systems/subsystems described herein. FIG. 1 is a block diagram of just one example data processing system in which aspects of the illustrative embodiments may be implemented. Data processing system 100 is an example of a computer in which computer usable code or instructions implementing the processes and aspects of the illustrative embodiments of the present invention may be located and/or executed so as to achieve the operation, output, and external affects of the illustrative embodiments as described herein.

In the depicted example, data processing system 100 employs a hub architecture including north bridge and memory controller hub (NB/MCH) 102 and south bridge and input/output (I/O) controller hub (SB/ICH) 104. Processing unit 106, main memory 108, and graphics processor 110 are connected to NB/MCH 102. Graphics processor 110 may be connected to NB/MCH 102 through an accelerated graphics port (AGP).

In the depicted example, local area network (LAN) adapter 112 connects to SB/ICH 104. Audio adapter 116, keyboard and mouse adapter 120, modem 122, read only memory (ROM) 124, hard disk drive (HDD) 126, CD-ROM drive 130, universal serial bus (USB) ports and other communication ports 132, and PCI/PCIe devices 134 connect to SB/ICH 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash basic input/output system (BIOS).

HDD 126 and CD-ROM drive 130 connect to SB/ICH 104 through bus 140. HDD 126 and CD-ROM drive 130 may use, for example, an integrated drive electronics (IDE) or serial advanced technology attachment (SATA) interface. Super I/O (SIO) device 136 may be connected to SB/ICH 104.

An operating system runs on processing unit 106. The operating system coordinates and provides control of various components within the data processing system 100 in FIG. 1. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 100.

As a server, data processing system 100 may be, for example, an IBM eServer™ System P® computer system, Power™ processor based computer system, or the like, running the Advanced Interactive Executive (AIX®) operating system or the LINUX® operating system. Data processing system 100 may be a symmetric multiprocessor (SMP) system including a plurality of processors in processing unit 106. Alternatively, a single processor system may be employed.

Instructions for the operating system, the object-oriented programming system, and applications or programs are located on storage devices, such as HDD 126, and may be loaded into main memory 108 for execution by processing unit 106. The processes for illustrative embodiments of the present invention may be performed by processing unit 106 using computer usable program code, which may be located in a memory such as, for example, main memory 108, ROM 124, or in one or more peripheral devices 126 and 130, for example.

A bus system, such as bus 138 or bus 140 as shown in FIG. 1, may be comprised of one or more buses. Of course, the bus system may be implemented using any type of communication fabric or architecture that provides for a transfer of data between different components or devices attached to the fabric or architecture. A communication unit, such as modem 122 or network adapter 112 of FIG. 1, may include one or more devices used to transmit and receive data. A memory may be, for example, main memory 108, ROM 124, or a cache such as found in NB/MCH 102 in FIG. 1.

As mentioned above, in some illustrative embodiments the mechanisms of the illustrative embodiments may be implemented as application specific hardware, firmware, or the like, application software stored in a storage device, such as HDD 126 and loaded into memory, such as main memory 108, for executed by one or more hardware processors, such as processing unit 106, or the like. As such, the computing device shown in FIG. 1 becomes specifically configured to implement the mechanisms of the illustrative embodiments and specifically configured to perform the operations and generate the outputs described hereafter with regard to efficiently transferring error data from a processing unit to an onboard management device.

In accordance with an illustrative embodiment, processing unit 106 saves failure data in machine check registers in response to a failure. The illustrative embodiments provide mechanisms for reading the failure data in these registers and communicating these failure data to an onboard management device.

Those of ordinary skill in the art will appreciate that the hardware in FIG. 1 may vary depending on the implementation. Other internal hardware or peripheral devices, such as flash memory, equivalent non-volatile memory, or optical disk drives and the like, may be used in addition to or in place of the hardware depicted in FIG. 1. Also, the processes of the illustrative embodiments may be applied to a multiple processor data processing system without departing from the spirit and scope of the present invention.

Moreover, the data processing system 100 may take the form of any of a number of different data processing systems including client computing devices, server computing devices, a tablet computer, laptop computer, telephone or other communication device, a personal digital assistant (PDA), or the like. In some illustrative examples, data processing system 100 may be a portable computing device that is configured with flash memory to provide non-volatile memory for storing operating system files and/or user-generated data, for example. Essentially, data processing system 100 may be any known or later developed data processing system without architectural limitation.

Figure 2:
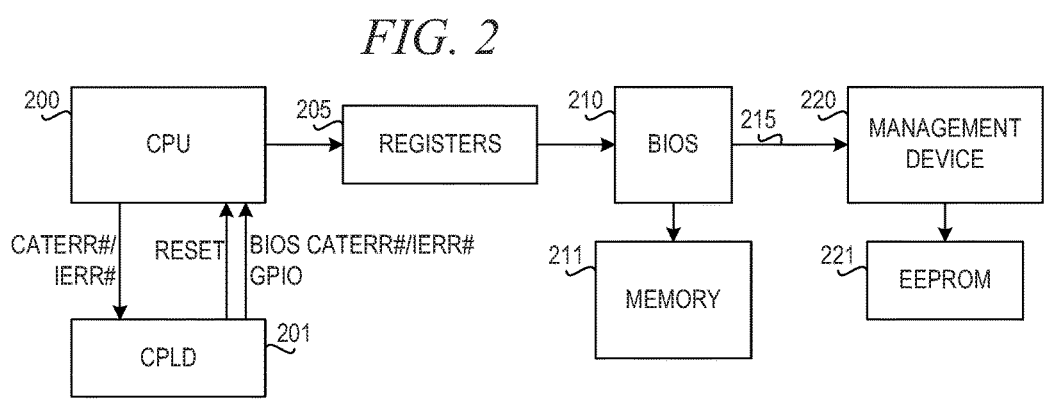
FIG. 2 is a block diagram illustrating a mechanism for efficiently transferring error data from a processing unit to an onboard management device in accordance with an illustrative embodiment.

FIG. 2 is a block diagram illustrating a mechanism for efficiently transferring error data from a processing unit to an onboard management device in accordance with an illustrative embodiment. In response to a catastrophic failure, central processing unit (CPU) 200 signals a catastrophic error (CATERR#/IERR#), stores failure/error data in machine check registers 205, and initiates a system reboot. Machine check architecture (MCA) is a mechanism in which the CPU 200 reports hardware errors to the operating system (not shown). Some processor architectures implement a machine check architecture that provides a mechanism for detecting and reporting hardware (machine) errors, such as: system bus errors, error correcting code (ECC) errors, parity errors, cache errors, and translation lookaside buffer errors. The machine check architecture may consist of a set of model-specific registers (MSRs) that are used to set up machine checking and additional banks of MSRs used for recording errors that are detected.

In one embodiment, CPU 200 may include a plurality of cores, and each core may have a plurality of banks of machine check registers 205. For example, CPU 200 may have sixteen cores, each having three banks of registers. In this example, CPU 200 would have forty-eight banks of registers 205.

At system reboot, BIOS 210 performs a power-on self-test (POST) and determines whether a catastrophic error was signaled by CPU 200. In an example embodiment, Complex Programmable Logic Device (CPLD) 201 detects whether CATERR# or IERR# is asserted and turns on general purpose input/output (GPIO) that goes to GPIO of the CPU 200 and then resets the CPU 200. BIOS 210 reads the state of the GPIO during the early part of the POST. In response to the BIOS 210 determining that a catastrophic error was signaled by the CPU 200, BIOS 210 begins to gather failure/error information from registers 205.

BIOS 210 reads the machine check registers 205 of CPU 200 to determine which registers have valid/invalid data. BIOS 210 stores the error data in memory 211. BIOS 210 then sends the data to management device 220. In an example embodiment, management device 220 is a programmable system-on-a-chip (PSoC) and BIOS 210 sends the data to management device 220 via I2C bus 215 using SMBus protocol.

BIOS sends the error data from registers 205 using two command types. The first command (0x00) is a time/date command, which has seven bytes of data. Bytes 1 and 2 are the year, byte 3 is the month, byte 4 is the day, byte 5 is the hour, byte 6 is the minute, and byte 7 is the second. Before the actual data is transferred, the BIOS 210 keeps a time stamp of when the error data were transferred.

The second command (0x01) is the actual data being transferred. The data command can have up to twenty-seven bytes of data, which are as follows:

Byte 1—Represents the number of the core (can represent up to 256 cores);

Byte 2—Represents the bank index inside the core (up to 32 banks) and whether status, address, and miscellaneous register values associated with the bank index are valid or invalid;

Bytes 3-10—Represents the status value;

Bytes 11-18—Represents the address value; and,

Bytes 19-27—Represents the miscellaneous value.

FIGS. 3A-3C depict SMBus command structure for transferring error data to an onboard management device in accordance with an illustrative embodiment. FIG. 3A depicts a SMBus protocol (Block read/write (R/W)) command. The command begins with a start protocol indicator (S) followed by a slave address, a read/write (R/W) bit, and an acknowledge (A). In one embodiment, the slave address is 0x2A for the PSoC address. The R/W bit is 0, because the BIOS always writes to the management device. The command then includes a command identifier and another acknowledge (A). The command identifier is 0x00 for a time stamp (time/date) command or 0x01 for an error (IERR) data command.

The command then includes a byte count and another acknowledge (A). As mentioned above, a time/date or time stamp command has seven bytes of data, and an IERR data command can have up to twenty-seven bytes of data. The command then includes each data byte followed by an acknowledge (A). After the last byte of data and its acknowledge, the command includes an end/stop protocol indicator (P). The data bytes 1 . . . N are the transfer data to be transferred to the management device.

FIG. 3B depicts the transfer data for a time/date command. Bytes 1 and 2 are the year. Byte 3 is the month. Byte 4 is the day. Byte 5 is the hour. Byte 6 is the minute. Byte 7 is the second. A processing unit can have sixteen cores, for example, and each core can have 11 banks. In this example, there will be one time/date command and one-hundred-seventy-six IERR data commands.

FIG. 3C depicts the transfer data for an IERR data command. Byte 1 represents the processor core index where the machine check happened. The processor core index can represent up to 256 cores. Byte 2 [7:3] indicates the machine check register index, and byte 2 [2:0] indicates whether the corresponding machine check status/address/miscellaneous registers are valid (1=valid, 0=invalid). Bytes 3-10 include the machine check status register value (valid if Byte2[2] is set). Bytes 11-18 include the machine check address register value (valid if Byte2[1] is set). Bytes 19-27 include the machine check miscellaneous register value (valid if Byte2[0] is set).

FIG. 4 is a flowchart illustrating operation of a processing unit for transferring failure data in accordance with an illustrative embodiment. Operation begins when a catastrophic error occurs (block 400). The processing unit stores the state of the cores in machine check registers (block 401). Thereafter, operation ends (block 402).

FIG. 5 is a flowchart illustrating operation of a mechanism for transferring failure data from a processing unit to an onboard management device in accordance with an illustrative embodiment. Operation begins upon system reboot (block 500). In one embodiment, the mechanism may be a BIOS operating in power-on self-test mode. The BIOS determines whether an error or failure is detected (block 501). In one embodiment, the BIOS determines whether the processing unit asserted an error or failure signal. If no error or failure is detected, then operation ends (block 507).

If the BIOS detects an error in block 501, then the BIOS gathers error information from the machine check registers (block 502). The BIOS determines which registers have valid or invalid data (block 503). The BIOS stores the valid error data in memory (block 504). Then, the BIOS sends the error information to the management device (block 505). Generation and transfer of the error information is described in further detail below with reference to FIG. 6.

In accordance with one embodiment, the BIOS sends the error information via an I2C bus using the SMBus protocol. The management device then stores the error data in an EEPROM (block 506). Thereafter, operation ends (block 507).

FIG. 6 is a flowchart illustrating operation of a mechanism for generating and transferring error information in accordance with an illustrative embodiment. Operation begins (block 600), and the mechanism generates a command with a time stamp (block 601). This time stamp command is an SMBus command with a time/date command identifier (0x00). The time stamp or time/date command has seven bytes of data. Bytes 1 and 2 are the year, byte 3 is the month, byte 4 is the day, byte 5 is the hour, byte 6 is the minute, and byte 7 is the second. The mechanism then sends the time stamp command to the management device (block 602).

Next, the mechanism examines the first core error information (block 603) and the first bank of registers (block 604). The mechanism generates a command with error data including the core index, bank index, valid bits, status value, address value, and miscellaneous value (block 605). The mechanism sends the data command to the management device (block 606).

The mechanism determines whether the current bank of registers is the last bank (block 607). If the bank of registers is not the last bank for the current core, then operation returns to block 604 to consider the next bank. If the bank of registers is the last bank for the current core in block 607, then the mechanism determines whether the current core is the last core in the processing unit (block 608). If the current core is not the last core, then operation returns to block 603 to examine the next core error information. If the current core is the last core in block 608, then operation ends (block 609).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for transferring failure data from a processing unit to a management device, the method comprising:
   in response to detecting a failure of the processing unit, gathering, by a basic input/output system (BIOS) of the data processing system, failure information from machine check registers of the processing unit;
   generating, by the BIOS, a time stamp command communicating a time and date of the failure information;
   sending, by the BIOS, the time stamp command to the management device;
   generating, by the BIOS, at least one error data command communicating error data derived from the failure information; and
   sending, by the BIOS, the at least one error data command to management device.

2. The method of claim 1, wherein the time stamp command and the at least one error data command are system management bus (SMBus) protocol commands.

3. The method of claim 2, wherein the time stamp command includes an address of the management device, a command identifier specifying a time stamp command type, and a plurality of bytes specifying a year, month, day, hour, minute, and second.

4. The method of claim 2, wherein a given error data command within the at least one error data command includes an address of the management device, a command identifier specifying an error data command type, and a plurality of bytes specifying a core index of a given core, a bank index of a given register bank of the given core, a status value valid bit, an address value valid bit, a miscellaneous value valid bit, a status value, an address value, and a miscellaneous value.

5. The method of claim 4, wherein the status value is valid if the status value valid bit is set, wherein the address value is valid if the address value valid bit is set, and wherein the miscellaneous value is valid if the miscellaneous value valid bit is set.

6. The method of claim 4, wherein the processing unit comprises a plurality of cores and wherein each core comprises a plurality of banks of machine check registers.

7. The method of claim 6, wherein generating the at least one error data command comprises generating an error data command for each bank of machine check registers of each core.

8. The method of claim 2, wherein sending the time stamp command to the management device comprises sending the time stamp command via an inter-integrated circuit (I2C) bus.

9. The method of claim 1, wherein the time stamp command and the at least one error data command are system management bus (SMBus) protocol commands;
   wherein sending the time stamp command to the management device comprises sending the time stamp command via an inter-integrated circuit (I2C) bus; and
   wherein the processing unit initiates a reboot in response to the failure and wherein the BIOS detects the failure of the processing unit during a power-on self-test (POST) operation in response to the reboot.

10. The method of claim 1, wherein the processing unit initiates a reboot in response to the failure and wherein the BIOS detects the failure of the processing unit during a power-on self-test (POST) operation in response to the reboot.

11. A computer program product comprising a computer readable storage medium having a computer readable program stored therein, wherein the computer readable program, when executed on a computing device, the computing device to:
   in response to detecting a failure of a processing unit, gather, by a basic input/output system (BIOS) of the data processing system, failure information from machine check registers of the processing unit;
   generate a time stamp command communicating a time and date of the failure information;
   send the time stamp command to the management device;
   generate at least one error data command communicating error data derived from the failure information; and
   send the at least one error data command to the management device.

12. The computer program product of claim 11, wherein the time stamp command and the at least one error data command are system management bus (SMBus) protocol commands.

13. The computer program product of claim 12, wherein the time stamp command includes an address of the management device, a command identifier specifying a time stamp command type, and a plurality of bytes specifying a year, month, day, hour, minute, and second.

14. The computer program product of claim 12, wherein a given error data command within the at least one error data command includes an address of the management device, a command identifier specifying an error data command type, and a plurality of bytes specifying a core index of a given core, a bank index of a given register bank of the given core, a status value valid bit, an address value valid bit, a miscellaneous value valid bit, a status value, an address value, and a miscellaneous value.

15. The computer program product of claim 14, wherein the processing unit comprises a plurality of cores, wherein each core comprises a plurality of banks of machine check registers, and wherein generating the at least one error data command comprises generating an error data command for each bank of machine check registers of each core.

16. The computer program product of claim 11, wherein the BIOS is connected to the management device by an inter-integrated circuit (I2C) bus;

wherein the processing unit initiates a reboot in response to the failure;

wherein the BIOS detects the failure of the processing unit during a power-on self-test (POST) operation in response to the reboot;

wherein the time stamp command and the at least one error data command are astern management bus (SMBus) protocol commands; and wherein sending the time stamp command to the management device comprises sending the time stamp command via the I2C bus.

17. An apparatus comprising:

a processing unit;

a basic input/output system (BIOS) connected to the processing unit; and a management device connected to the BIOS by an inter-integrated circuit (I2C) bus, wherein the processing unit initiates a reboot in response to the failure;

wherein the BIOS detects a failure of the processing unit during a power-on self-test (POST) operation in response to the reboot;

wherein the BIOS gathers failure information from machine check registers of the processing unit;

wherein the BIOS generates a time stamp command communicating a time and date of the failure information;

wherein the BIOS sends the time stamp command to the management device via the I2C bus;

wherein the BIOS generates at least one error data command communicating error data derived from the failure information; and wherein the BIOS sends the at least one error data command to the management device via the I2C bus.

18. The apparatus of claim 17, wherein the time stamp command and the at least one error data command are system management bus (SMBus) protocol commands.

19. The apparatus of claim 18, wherein the time stamp command includes an address of the management device, a command identifier specifying a time stamp command type, and a plurality of bytes specifying a year, month, day, hour, minute, and second.

20. The apparatus of claim 18, wherein a given error data command within the at least one error data command includes an address of the management device, a command identifier specifying an error data command type, and a plurality of bytes specifying a core index of a given core, a bank index of a given register bank of the given core, a status value valid bit, an address value valid bit, a miscellaneous value valid hit, a status value, an address value, and a miscellaneous value.

21. The apparatus of claim 20, wherein the processing unit comprises a plurality of cores, wherein each core comprises a plurality of banks of machine check registers, and wherein generating the at least one error data command comprises generating an error data command for each bank of machine check registers of each core.

* * * * *